United States Patent
Okamura

(10) Patent No.: US 10,066,740 B2
(45) Date of Patent: Sep. 4, 2018

(54) SHIFT CONTROL SYSTEM AND SHIFT CONTROL METHOD FOR AUTOMATIC VEHICLE TRANSMISSION

(71) Applicant: TOYOTA JIDOSHA KABUSHIKI KAISHA, Toyota-shi, Aichi-ken (JP)

(72) Inventor: Koji Okamura, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 78 days.

(21) Appl. No.: 15/253,064

(22) Filed: Aug. 31, 2016

(65) Prior Publication Data
US 2017/0059035 A1    Mar. 2, 2017

(30) Foreign Application Priority Data

Sep. 2, 2015  (JP) .................................. 2015-172826
May 18, 2016  (JP) .................................. 2016-099602

(51) Int. Cl.
*F16H 61/04*    (2006.01)
*F16H 61/02*    (2006.01)

(52) U.S. Cl.
CPC ......... *F16H 61/0213* (2013.01); *F16H 61/04* (2013.01); *F16H 2061/0444* (2013.01)

(58) Field of Classification Search
CPC .. F16H 61/0213; F16H 61/0204; F16H 61/04; F16H 59/14; F16H 59/18
See application file for complete search history.

(56) References Cited

U.S. PATENT DOCUMENTS

| | | | | |
|---|---|---|---|---|
| 5,067,373 A | * | 11/1991 | Kyohzuka | ........... F16H 61/0213 477/125 |
| 5,697,864 A | | 12/1997 | Watanabe | |
| 2002/0046617 A1 | * | 4/2002 | Inagawa | ............. F16H 61/0437 74/335 |
| 2008/0026909 A1 | * | 1/2008 | Bothe | ................. F16H 61/0213 477/115 |
| 2008/0312036 A1 | * | 12/2008 | Yagi | .................... F16H 61/0213 477/115 |
| 2014/0088789 A1 | | 3/2014 | Jeon | |

FOREIGN PATENT DOCUMENTS

| | | |
|---|---|---|
| JP | H08-189559 A | 7/1996 |
| JP | 2013-087800 A | 5/2013 |
| JP | 2014-066692 A | 4/2014 |

\* cited by examiner

*Primary Examiner* — Huan G Le
(74) *Attorney, Agent, or Firm* — Hunton Andrews Kurth LLP

(57) ABSTRACT

A shift control system and a shift control method configured to execute a skip shift smoothly are provided. The shift control system selects an interim gear stage with reference to a control map. The control map is configured to determine: an intense region where a driver is allowed to sense an increase in the acceleration sufficiently based on an unconscious period, and a stimulation intensity; and a moderate region where acceleration is increased in a mild manner. During execution of the skip shift, the acceleration is increased in a mild manner by shifting the gear stage from an initial stage to the interim gear stage, and then increased significantly by shifting the gear stage from the interim gear stage to a target gear stage.

5 Claims, 5 Drawing Sheets

SHIFT CONTROL SYSTEM AND SHIFT CONTROL METHOD FOR AUTOMATIC VEHICLE TRANSMISSION

CROSS REFERENCE TO RELATED APPLICATIONS

The present application claims the benefit of priority to Japanese Patent Applications No. 2015-172826 filed on Sep. 2, 2015 and No. 2016-099602 filed on May 18, 2016 with the Japanese Patent Office, the entire contents of which are incorporated herein by reference in its entirety.

BACKGROUND

Field of the Disclosure

Embodiments of the present application relates to the art of a control system and a control method for an automatic vehicle transmission configured to change a speed ratio stepwise.

Discussion of the Related Art

U.S. Pat. No. 5,697,864 describes a shift control apparatus for an automatic vehicle transmission configured to carry out a skip shift of two stages or more. The transmission taught by U.S. Pat. No. 5,697,864 includes a first transmission gear unit equipped with a clutch to clutch shift mechanism, and a second transmission gear unit equipped with a clutch to one-way clutch shift mechanism. According to the teachings of U.S. Pat. No. 5,697,864, the shift control apparatus controls the clutch-to-clutch shift mechanism and the clutch to one-way clutch shift mechanism in such a manner that rotational synchronization of the clutch to one-way clutch shift mechanism is caused to take place earlier than or at the same time as rotational synchronization of the clutch to clutch shift mechanism when gear shifting is effected over the first and second transmission gear units.

US 2014/0088789 describes an evaluation method for a shift feeling of a vehicle in which a shift feeling felt by an occupant when a vehicle is accelerated-shifted is quantified objectively by using human sensibility ergonomic concept. According to the teachings of US 2014/0088789, an initial acceleration response time, a final acceleration arriving time, an average acceleration maintaining amount during a predetermined time period after arriving a maximum acceleration, an acceleration rising slope, an initial maximum jerk and an end maximum jerk are detected as measurement factors. Then, four sensory factors of a responsiveness, a strength, a smoothness and an unperceivable are calculated by multiplying the six measurement factors by different arithmetic coefficients, respectively, and summating them.

JP-A-2013-87800 describes a dual clutch type automatic transmission and a gear shift control method thereof. According to the teachings of JP-A-2013-87800, an interim gear stage of a skip downshift is determined based on a predictive vehicle acceleration.

During execution of downshifting, acceleration is increased after an inevitable delay depending on a gear stage or a speed change pattern. For this reason, if an order of executing shifting operation of the first and the second transmissions is fixed as taught by U.S. Pat. No. 5,697,864 to achieve a skip downshift across at least one stage, it may take a longer time to increase the acceleration to an extent that a driver can sense the acceleration. According to the teachings of US 2014/0088789, a speed change rate is considered as the response time to evaluate a shift feeling. In this case, an elongation of a speed change period may downgrade the evaluation of the shift feeling.

The above-explained disadvantages may be solved by setting an interim gear stage during the skip downshift as taught by JP-A-2013-87800. In this case, the interim gear stage may be determined in such a manner as to improve a shifting response to carry out the skip downshift without delay. However, the skip downshift may be executed stepwise from an initial gear stage to the interim gear stage, and from the interim gear stage to the target gear stage. In this case, therefore, the drive may feel a shock during the skip downshift.

SUMMARY

Aspects of the present application have been conceived noting the foregoing technical problems, and it is therefore an object of the present application is to provide a shift control system and a shift control method to improve an acceleration feel by changing a speed ratio smoothly without delay.

According to one aspect of embodiments of the present application, there is provided a shift control system for an automatic vehicle transmission that shifts a speed ratio stepwise in accordance with a vehicle speed or a required drive force. In order to achieve the above-explained objective, the shift control system is provided with: a controller that controls the speed ratio; and a control map installed in the controller that determines: an intense region where a driver is allowed to sense an increase in the acceleration based on an unconscious period in which a drive force has not yet been changed to an extent that the driver is allowed to sense a change in the acceleration, and a stimulation intensity governed by a change amount of the acceleration after the unconscious period and a jerk; and a moderate region defined between a first lower boundary of the intense region determined by a first lower limit value of the stimulation intensity and a first upper limit value of the unconscious period in the intense region, and a second lower boundary determined by a second lower limit value of the stimulation intensity that is smaller than the first lower limit value but the driver is still allowed to sense a change in the acceleration and a second upper limit value of the unconscious period that is larger than the first upper limit value. Specifically, the controller is configured: to select a first interim speed ratio between an initial speed ratio and a target speed ratio determined based on a drive force required by an accelerating operation of the driver with reference to the control map in such a manner that the stimulation intensity and the unconscious period fall within the intense region by shifting the speed ratio from the first interim speed ratio to the target speed ratio, in a case where the stimulation intensity and the unconscious period fall out of the intense region by shifting the speed ratio directly from the initial speed ratio to the target speed ratio; to execute a first shifting from the initial speed ratio to the first interim speed ratio and a second shifting from the first interim speed ratio to the target speed ratio, in a case where the stimulation intensity and the unconscious period fall within the moderate region by executing the first shifting; to select at least one second interim speed ratio between the initial speed ratio and the first interim speed ratio with reference to the control map in such a manner that the stimulation intensity and the unconscious period fall within the moderate region by shifting the speed ratio from the initial speed ratio to the first interim speed ratio, in a case where the stimulation intensity and the unconscious period fall out of the moderate region by shifting the speed ratio from the initial speed ratio to the first interim speed ratio; and to execute a third shifting from the initial speed ratio to the second interim speed ratio, a fourth shifting from the second interim speed ratio to the first interim speed ratio, and the second shifting, in a case where the second interim speed ratio is selected between the initial speed ratio and the first interim speed ratio.

In a non-limiting embodiment, the transmission may include a geared transmission, and the speed ratio may include a gear stage of the geared transmission.

In a non-limiting embodiment, the transmission may include a continuously variable transmission, and the interim speed ratio may include a speed ratio between steps of the speed ratio.

In a non-limiting embodiment, the controller may be further configured to select a speed ratio closest to the initial speed ratio as the interim speed ratio, in a case where the interim speed ratio may be selected from a plurality of speed ratios.

According to another aspect of embodiments of the present application, there is provided a shift control method for an automatic vehicle transmission that shifts a speed ratio stepwise in accordance with a vehicle speed or a required drive force, comprising: a control map that determines: an intense region where a driver is allowed to sense an increase in the acceleration based on an unconscious period in which a drive force has not yet been changed to an extent that the driver is allowed to sense a change in the acceleration, and a stimulation intensity governed by a change amount of the acceleration after the unconscious period and a jerk; and a moderate region defined between a first lower boundary of the intense region determined by a first lower limit value of the stimulation intensity and a first upper limit value of the unconscious period in the intense region, and a second lower boundary determined by a second lower limit value of the stimulation intensity that is smaller than the first lower limit value but the driver is still allowed to sense a change in the acceleration and a second upper limit value of the unconscious period that is larger than the first upper limit value; selecting a first interim speed ratio between an initial speed ratio and a target speed ratio determined based on a drive force required by an accelerating operation of the driver with reference to the control map in such a manner that the stimulation intensity and the unconscious period fall within the intense region by shifting the speed ratio from the first interim speed ratio to the target speed ratio, in a case where the stimulation intensity and the unconscious period fall out of the intense region by shifting the speed ratio directly from the initial speed ratio to the target speed ratio; executing a first shifting from the initial speed ratio to the first interim speed ratio and a second shifting from the first interim speed ratio to the target speed ratio, in a case where the stimulation intensity and the unconscious period fall within the moderate region by executing the first shifting; selecting at least one second interim speed ratio between the initial speed ratio and the first interim speed ratio with reference to the control map in such a manner that the stimulation intensity and the unconscious period fall within the moderate region by shifting the speed ratio from the initial speed ratio to the first interim speed ratio, in a case where the stimulation intensity and the unconscious period fall out of the moderate region by shifting the speed ratio from the initial speed ratio to the first interim speed ratio; and executing a third shifting from the initial speed ratio to the second interim speed ratio, a fourth shifting from the second interim speed ratio to the first interim speed ratio, and the second shifting, in a case where the second interim speed ratio is selected between the initial speed ratio and the first interim speed ratio.

Thus, according to the embodiment of the present application, if the unconscious period will not be short enough and the stimulation intensity will not be strong enough even if the speed ratio is shifted directly to the target ratio, the first interim speed ratio is set with reference to the control map, and the second interim speed ratio is set according to need. In this case, the speed ratio is shifted from the initial speed ratio to the target speed ratio via the second interim speed ratio if available, and via the first interim speed ratio. Specifically, the first shifting and the second shifting are executed sequentially, or the third shifting, the fourth shifting and the second shifting are executed sequentially. As a result of shifting the speed ratio from the initial ratio to the first interim speed ratio, or to the first interim speed ratio via the second interim speed ratio, the stimulation intensity and the unconscious period fall within the moderate region so that the driver is allowed to sense a commencement of increase in the acceleration. Then, as a result of shifting the speed ratio from the first interim speed ratio or the second interim speed ratio to the target speed ratio, the stimulation intensity and the unconscious period fall within the intense region so that the driver is allowed to sense an increase in the acceleration sufficiently in response to an accelerating operation. In addition, since the stimulation intensity and the unconscious period fall within the moderate region in the initial phase of such a skip shifting, the driver is allowed to sense a smooth increase in the acceleration without delay. Thus, the acceleration can be increased smoothly in good response when the speed ratio is changed significantly to achieve a large required driving force.

In addition, given that the geared transmission is used in the vehicle, the acceleration may be increased smoothly during execution of the skip shift utilizing the interim gear stage(s).

Alternatively, given that the continuously variable transmission is used in the vehicle, the acceleration may also be increased smoothly during changing the speed ratio significantly utilizing the interim speed ratio(s) between steps of the speed ratio.

Further, if the interim speed ratio may be selected from a plurality of speed ratios, a speed ratio close to the initial speed ratio is selected as the first interim speed ratio. For this reason, the stimulation intensity is increased during the second shifting so that the acceleration feel can be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
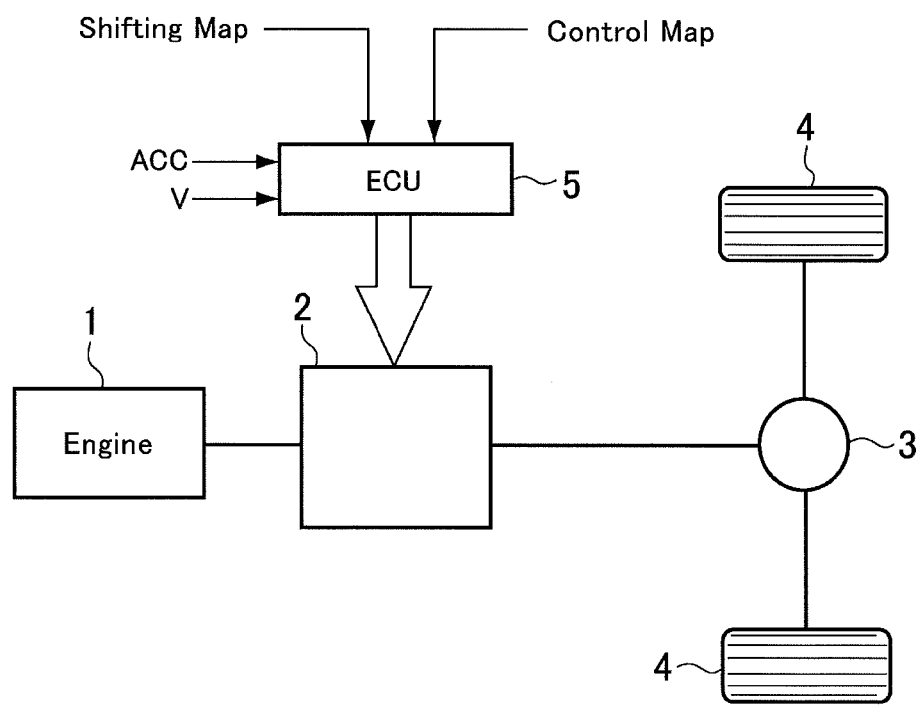
FIG. 1 is a schematic illustration showing one example of a powertrain of the vehicle to which the control system according to the embodiment is applied.

Preferred embodiments of the present application will now be explained with reference to the accompanying drawings. Referring now to FIG. 1, there is shown one example of a powertrain of a vehicle to which the control system and the control method according to the preferred embodiment are applied. As illustrated in FIG. 1, an automatic transmission (as will be simply called the "transmission" hereinafter) 2 adapted to establish a plurality of gear stages or to change a speed ratio stepwise is connected to an output side of an engine 1, and an output torque of the transmission 2 is distributed to drive wheels 3 and 4 through a differential gear unit 3. In the vehicle shown in FIG. 1, not only a geared transmission adapted to shift a gear stage by manipulating a clutch and a brake, but also a continuously variable transmission adapted to change a speed ratio by varying effective running radii of a belt running on pulleys may be used as the transmission 2. In addition, the control system and the control method according to the preferred embodiment may also be applied to a hybrid drive unit in which the engine, an output member, and a motor having a generating function are connected to the continuously variable serving as a power distribution device, and an engine speed is changed continuously by the motor. In the vehicle using the continuously variable transmission, a plurality of speed ratios to establish desired gear stages are set in advance so that the speed ratio can be changed stepwise.

In order to control a shifting operation of the transmission 2, an electronic control unit (abbreviated as the "ECU" hereinafter) 5 as a controller is connected to the transmission 2. The ECU 5 is composed mainly of a microcomputer that is configured to carry out a calculation based on incident data and preinstalled data, and to transmit a calculation result in the form of command signal. For example, detection values of a vehicle speed V, and an accelerator opening ACC as a drive demand detected by not shown sensors are sent to the ECU 5, and a shifting map for changing a speed ratio stepwise and a control map for selecting an interim gear stage etc. are installed in the ECU 5.

Figure 2:
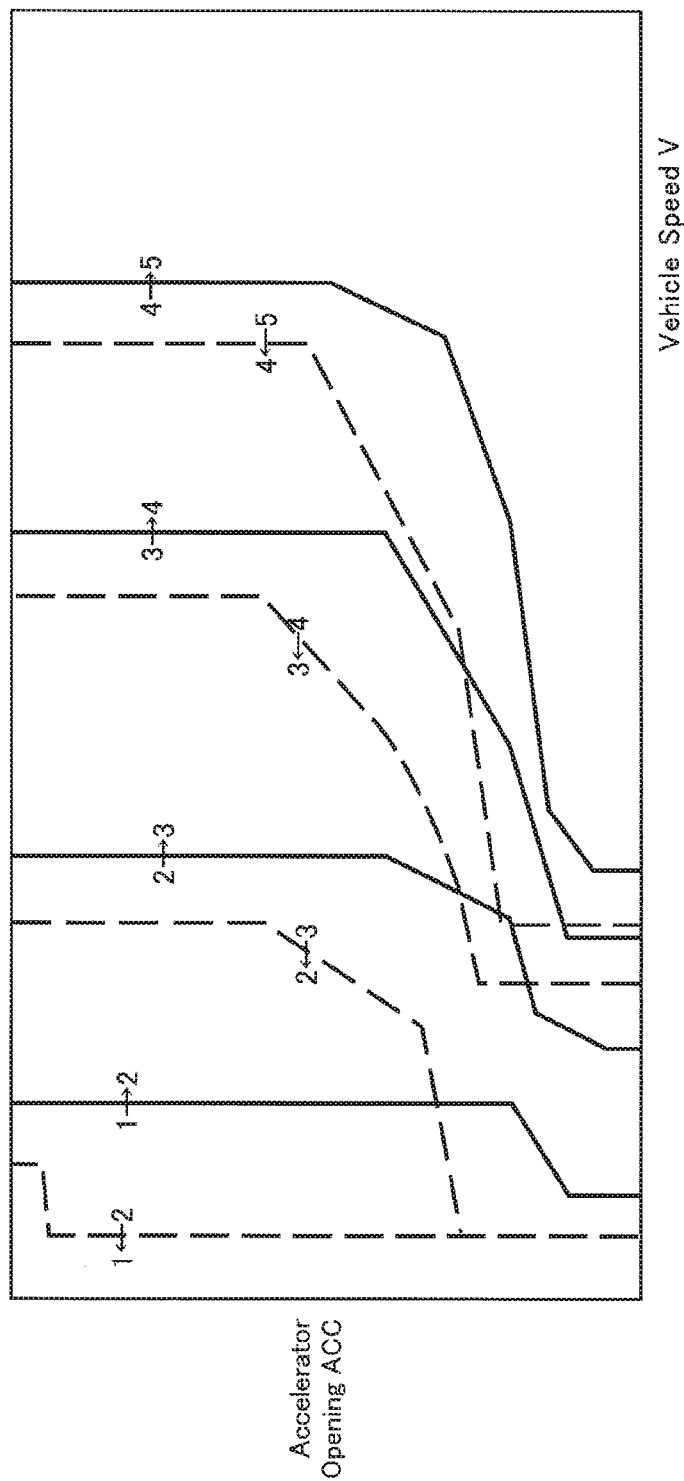
FIG. 2 shows one example of a shifting map.

Turning to FIG. 2, there is shown one example of the shifting map for determining the gear stage. In FIG. 2, the vertical axis represents the accelerator opening ACC, and the horizontal axis represents the vehicle speed V. Each solid curve is an upshift line, and an upshift to a predetermined gear stage is executed when an operating point of the vehicle determined based on the vehicle speed V and the accelerator opening ACC is changed across the upshift line from left to right or downwardly in FIG. 2. On the other hand, each dashed curve is a downshift line, and a downshift to a predetermined gear stage is executed when the vehicle speed V is reduced so that the operating point is changed across the downshift line from right to left in FIG. 2, or the accelerator opening ACC is increased so that the operating point is changed across the downshift line upwardly in FIG. 2. As can be seen from FIG. 2, a predetermined hysteresis area is maintained between each of the downshift line and each of the upshift line. If the operating point is changed across a plurality of the upshift lines or downshift lines, a skip shift is executed. Alternatively, the operating point thus representing a running condition of the vehicle may also be determined based on a rotational speed of a predetermined rotary member instead of the vehicle speed V, and a depression of an accelerator pedal or the like instead of the accelerator opening ACC.

Figure 3:
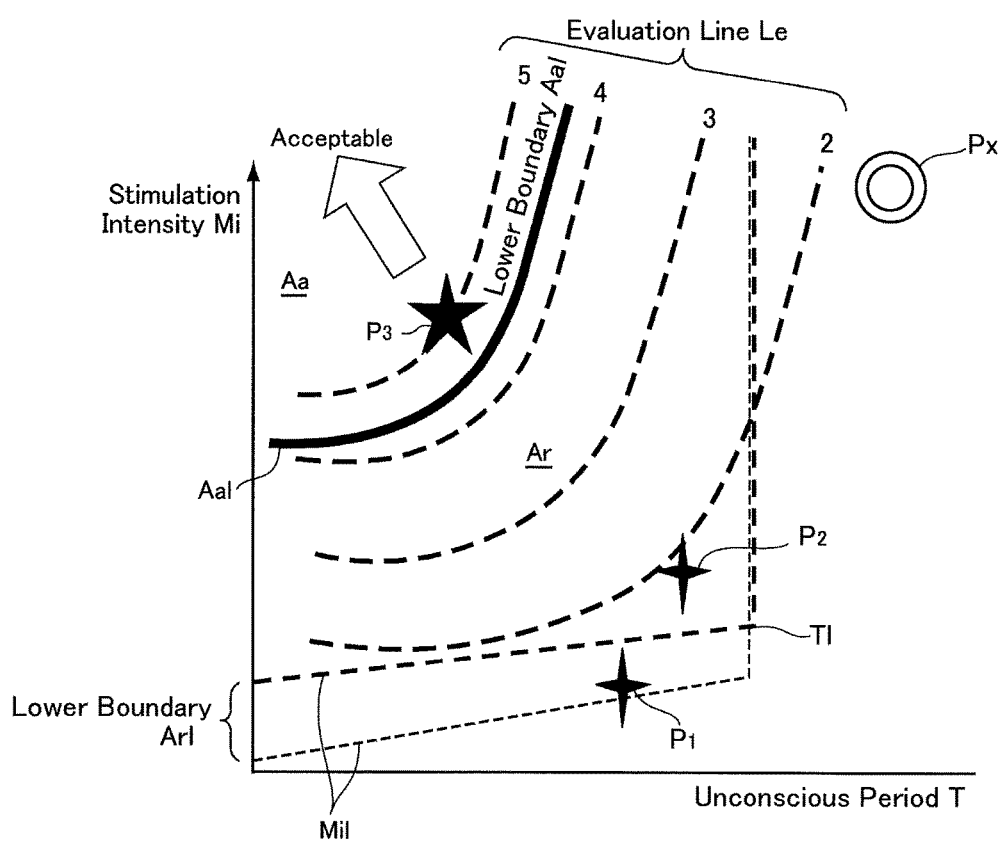
FIG. 3 shows one example of a control map.

FIG. 3 shows an example of a control map for selecting a gear stage in line with an intension of the driver to accelerate the vehicle. In the map shown in FIG. 3, specifically, a moderate region Ar where the acceleration in increased in a mild manner, and an intense region Aa where the acceleration is increased significantly so that the driver is allowed to sense an increase in the acceleration, are determined based on an unconscious period T and a stimulation intensity Mi.

Specifically, the unconscious period T is a period of time from a point at which a changing factor of the (longitudinal) acceleration G occurs to a point at which the driver starts sensing a change in the acceleration G, and the unconscious period T includes a control delay and a response time governed by a model and a grade of the vehicle. On the other hand, the stimulation intensity Mi is a physical quantity obtained by multiplying a change amount $\Delta G$ of the acceleration G immediately after a termination of the unconscious period T by a jerk (i.e., a derivative of acceleration G with respect to time) J, as expressed by: $Mi=\Delta G \cdot J$.

Figure 4:
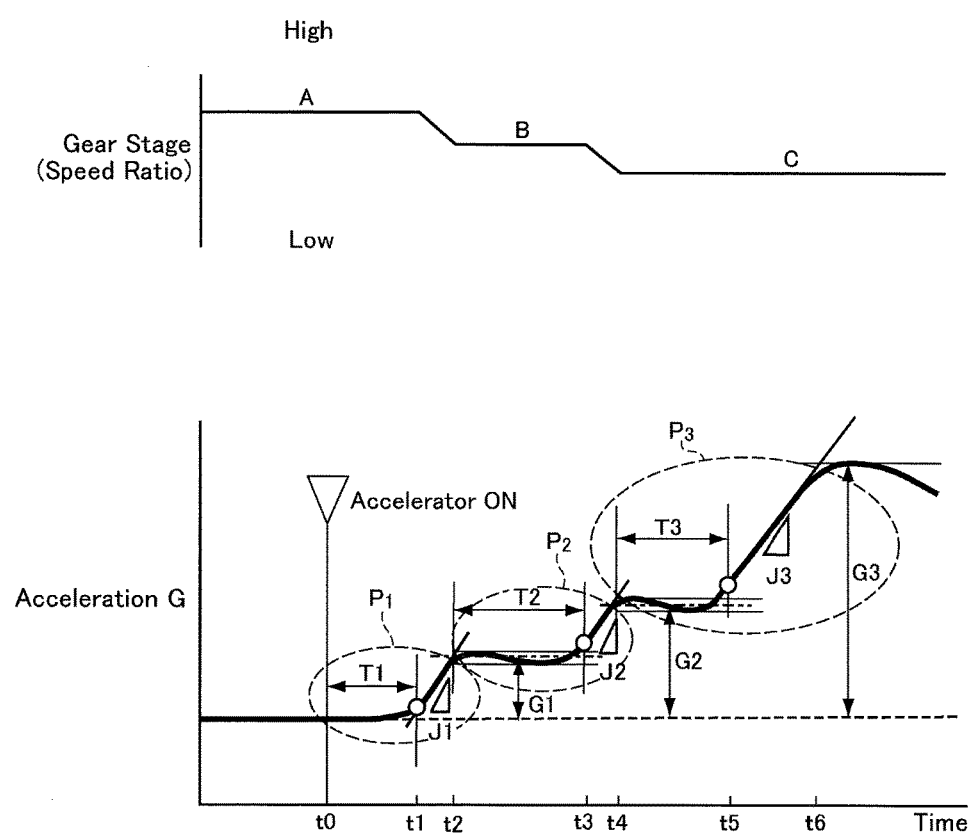
FIG. 4 is a time chart indicating a transition of the gear stage and a change in acceleration during execution of the skip shift through an interim gear stage.

Turning to FIG. 4, there is shown one example of changes in the acceleration G and the jerk J, and the unconscious periods T during execution of a skip shift from a predetermined gear stage A caused by depressing an accelerator pedal. In FIG. 4, the vertical axis represents the acceleration G, and the horizontal axis represents time. In addition, a transition of the gear stage (i.e., a speed ratio) during execution of the skip shift is also indicated in FIG. 4. In the example shown in FIG. 4, the accelerator pedal is depressed at point t0 (indicated as "accelerator ON" in FIG. 4). Consequently, an engine torque is increased to increase the acceleration G, and the driver starts sensing an increase in the acceleration G at point t1. That is, the point t1 is determined by a result of a sensory test. During a first unconscious period T1 from the point t0 at which an accelerating operation (i.e., a changing factor of the acceleration) is executed to the point t1, a drive force is not changed significantly and hence the driver cannot sense a change (i.e., an increase) in the acceleration G. An inventor of the present application found that the first unconscious period T is extended with an increase in the vehicle speed V.

After the termination of the first unconscious period T1, as indicated by a solid curve in FIG. 4, the acceleration G is increased to a peak value in the initial gear stage A at point t2, and temporarily remains on a plateau from the point t2. During an increase in the acceleration G, such cessation of increase in the acceleration G is an unexpected (or novel) event for the driver, and hence the driver has an orienting response to such cessation of increase in the acceleration G so that the driver can sense an increase in the acceleration until the point t2. In this situation, a downshifting from the initial gear stage A to an interim gear stage B is executed, and hence the acceleration G is maintained substantially constant while being fluctuated slightly from the point t2 to point t3 at which the driver starts sensing an increase in the acceleration G in the interim gear stage B. That is, the driver senses an increase in the acceleration G to an average value G1 of the acceleration G during a second unconscious period T2 from the point t2 to the point t3. The second unconscious period T2 is also extended with an increase in the vehicle speed V.

A first jerk J1 as a rate of change of the acceleration G from the point t1 to the point t2 may be calculated by a least-square method, and a first stimulation intensity Mi1 from the point t1 to the point t2 may be calculated by multiplying the first jerk J1 by a first change amount $\Delta G1$ of the acceleration G from a value at the point t1 to the average value G1.

After the termination of the second unconscious period T2, the acceleration G is increased to a peak value in the interim gear stage B at point t4, and temporarily remains on a plateau from the point t4. The driver also has an orienting response to such cessation of increase in the acceleration G so that the driver can sense an increase in the acceleration until the point t4. In this situation, a downshifting from the interim gear stage B to a target gear stage C is executed to achieve a required drive force, and hence the acceleration G is maintained substantially constant while being fluctuated slightly from the point t4 to point t5 at which the driver starts sensing an increase in the acceleration G in the target gear stage C. That is, the driver again senses an increase in the acceleration G to an average value G2 of the acceleration G during a third unconscious period T3 from the point t4 to the point t5. The third unconscious period T3 is also extended with an increase in the vehicle speed V.

A second jerk J2 as a rate of change of the acceleration G from the point t3 to the point t4 may also be calculated by a least-square method, and a second stimulation intensity Mi2 from the point t3 to the point t4 may also be calculated by multiplying the second jerk J2 by a second change amount ΔG2 of the acceleration G from a value at the point t3 to the average value G2.

After the termination of the third unconscious period T3, the acceleration G is increased to a peak value G3 in the target gear stage C at point t6, and the driver also has an orienting response to such termination of increase in the acceleration G so that the driver can sense an increase in the acceleration until the point t6. That is, the driver again senses an increase in the acceleration G to the peak value G3 of the acceleration G.

A third jerk J3 as a rate of change of the acceleration G from the point t5 to the point t6 may also be calculated by a least-square method, and a third stimulation intensity Mi3 from the point t5 to the point t6 may also be calculated by multiplying the third jerk J3 by a third change amount ΔG3 of the acceleration G from a value at the point t5 to the peak value G3.

Each of the unconscious period T and each of the stimulation intensity Mi individually represents a behavior of the vehicle changed by an accelerating operation and a resultant shifting operation that is sensed by the driver. The inventor of the present application found that the driver or a passenger(s) makes an assessment of acceleration based on those parameters. For example, given that the unconscious period T is long and that the stimulation intensity Mi is strong, target acceleration (i.e., target drive force) can be achieved but the driver feels that acceleration response is slow. The unconscious period T may be reduced by executing a skip shift. However, if a change amount of acceleration in an initial stage is similar or equal to a change amount of acceleration in a final stage, the driver feels an increase in acceleration two times during execution of the skip shift.

Thus, the acceleration response becomes worse with an increase in a period from a point at which an accelerating operation is commenced to a point at which the driver sense a change in acceleration, and the driver feels changes in the acceleration at least two times during execution of the skip shift. According to the embodiment, in order to improve an acceleration feel, the control system is configured to increase the stimulation intensity Mi resulting from increasing acceleration during shifting a gear stage to a target stage, while allowing the driver to sense a change in acceleration at earlier phase in the accelerating operation. To this end, in the control map shown in FIG. 3, the aforementioned moderate region Ar and intense region Aa are determined based on the unconscious period T and the stimulation intensity Mi. Specifically, in the moderate region Ar, a vehicle behavior is changed promptly in response to an accelerating operation but the stimulation intensity Mi is suppressed to a level at which the driver cannot sense an increase in the acceleration.

By contrast, in the intense region Aa, the unconscious period T is reduced and the stimulation intensity Mi is increased to a level at which the driver can sense an increase in acceleration sufficiently. Specifically, the control map shown in FIG. 3 is used to select an interim gear stage (i.e., an interim speed ratio) in the skip shift.

The moderate region Ar and the intense region Aa are determined based on a result of an in-vehicle sensory test. In order to collect various data while varying acceleration and response time widely, it is preferable to use a vehicle in which a prime mover includes a motor in the sensory test. In the sensory test, an acceleration feel in the vehicle is scored out of 5 while varying the unconscious period T and the stimulation intensity Mi. In FIG. 3, evaluation lines Le individually indicating a score of the acceleration feel from 2 point to 5 point are drawn by connecting same or similar scores. In order to prepare the control map accurately, it is preferable to conduct the sensory test by a professional driver and a test driver, and the sensory test is preferably conducted by as many drivers as possible. As can be seen from FIG. 3, the acceleration feel is degraded with an increase in the unconscious period T and with a decrease in the stimulation intensity Mi. That is, the acceleration response becomes slow and hence an intended acceleration feel will not be achieved. In the control map shown in FIG. 3, a region where the evaluation score is higher than a predetermined score is set as the intense region Aa. Specifically, a lower boundary Aal of the intense region Aa is drawn by connecting the evaluation scores of approximately "4.3", and the region where the stimulation intensity Mi is stronger than the lower boundary Aal and the unconscious period T is shorter than the lower boundary Aal is set as the intense region Aa. That is, the lower boundary Aal is determined by a lower limit value of the stimulation intensity Mi and an upper limit value of the unconscious period T of the intense region Aa.

It is preferable to shift the lower boundary Aal of the intense region Aa depending on a maximum acceleration of the vehicle and an allowable jerk. For example, given that the maximum acceleration achieved by the vehicle is large, the acceleration can be changed significantly within a short period of time. In this case, therefore, the lower boundary Aal is preferably shifted to a larger value. Specifically, in the control system used in the vehicle that can generate larger acceleration than that generated by the vehicle used in the sensory test to prepare the map, the lower limit value of the stimulation intensity Mi of the intense region Aa is shifted to a larger value and the upper limit value of the unconscious period T of the intense region Aa is shifted to the smaller value, in accordance with a difference or ratio between the acceleration generated by the vehicle used in the sensory test and the acceleration generated by the vehicle to which the control system is applied.

An acceptable jerk, that is, a jerk to accelerate the vehicle satisfactory to the driver differs depending on a class or grade of the vehicle and an operating mode such as a sporty mode and a normal mode. If the acceptable jerk is large, the acceleration can be changed in a desired amount within a short period of time, and hence the lower boundary Aal of the intense region Aa is also shifted upwardly and inwardly in the control map shown in FIG. 3. Specifically, provided that the control system is used in a vehicle that can achieve a larger acceptable jerk, the lower limit value of the stimulation intensity Mi of the intense region Aa is also shifted to a larger value and the upper limit value of the unconscious period T of the intense region Aa is also shifted to the smaller value, in accordance with a difference or ratio between the acceptable jerk achieved by the vehicle used in the sensory test and the acceptable jerk achieved by the vehicle to which the control system is applied.

In the control map shown in FIG. 3, a region where the stimulation intensity Mi is weaker than the lower boundary Aal and the unconscious period T is longer than the lower boundary Aal is set as the moderate region Ar. A lower boundary Arl of the moderate region Ar is determined based on a lower limit value Mi1 of the stimulation intensity Mi and an upper limit value T1 of the unconscious period T. The lower limit value Mi1 is determined in such a manner that the stimulation intensity Mi can be generated strong enough to allow the driver to sense an increase in the acceleration, and the upper limit value T1 is determined in such a manner that the unconscious period T is limited to a length not to cause a delay in sensing an increase in the acceleration by the driver. Here, the lower boundary Arl may be shifted arbitrarily unless the stimulation intensity Mi is weakened to such an extent that the driver cannot sense an increase in the acceleration, and unless the unconscious period T is extended to such an extent that an increase in the acceleration is delayed. Thus, in the control map shown in FIG. 3, the moderate region Ar is defined by the lower boundary Aal and the lower boundary Arl. Another lower boundary Arl situated lower than the lower boundary Arl may be determined in accordance with an initial change amount of the acceleration changed by an accelerating operation, or in accordance with a gear stage. Alternatively, another lower boundary Arl may also be set as a straight line irrespective of a change amount of the acceleration and a gear stage. Specifically, each line representing the lower limit value Mi1 is positively sloped so that the stimulation intensity Mi is increased with an increase in the unconscious period T. In addition, since a behavior of the vehicle is changed significantly at a high speed range, each of the lower limit line Mi1 is in such a manner that the stimulation intensity Mi is increased with an increase in the vehicle speed.

Thus, as can be seen from in FIG. 3, the lower limit value Mi1 of the stimulation intensity Mi of the moderate region Ar is smaller than that of the lower boundary Aal of the intense region Aa, and the upper limit value T1 of the unconscious period T of the moderate region Ar is larger than that of the lower boundary Aal of the intense region Aa. Specifically, the moderate region Ar is defined by the lower boundary Aal of the intense region Aa and the lower boundary Arl thereof.

Figure 5:
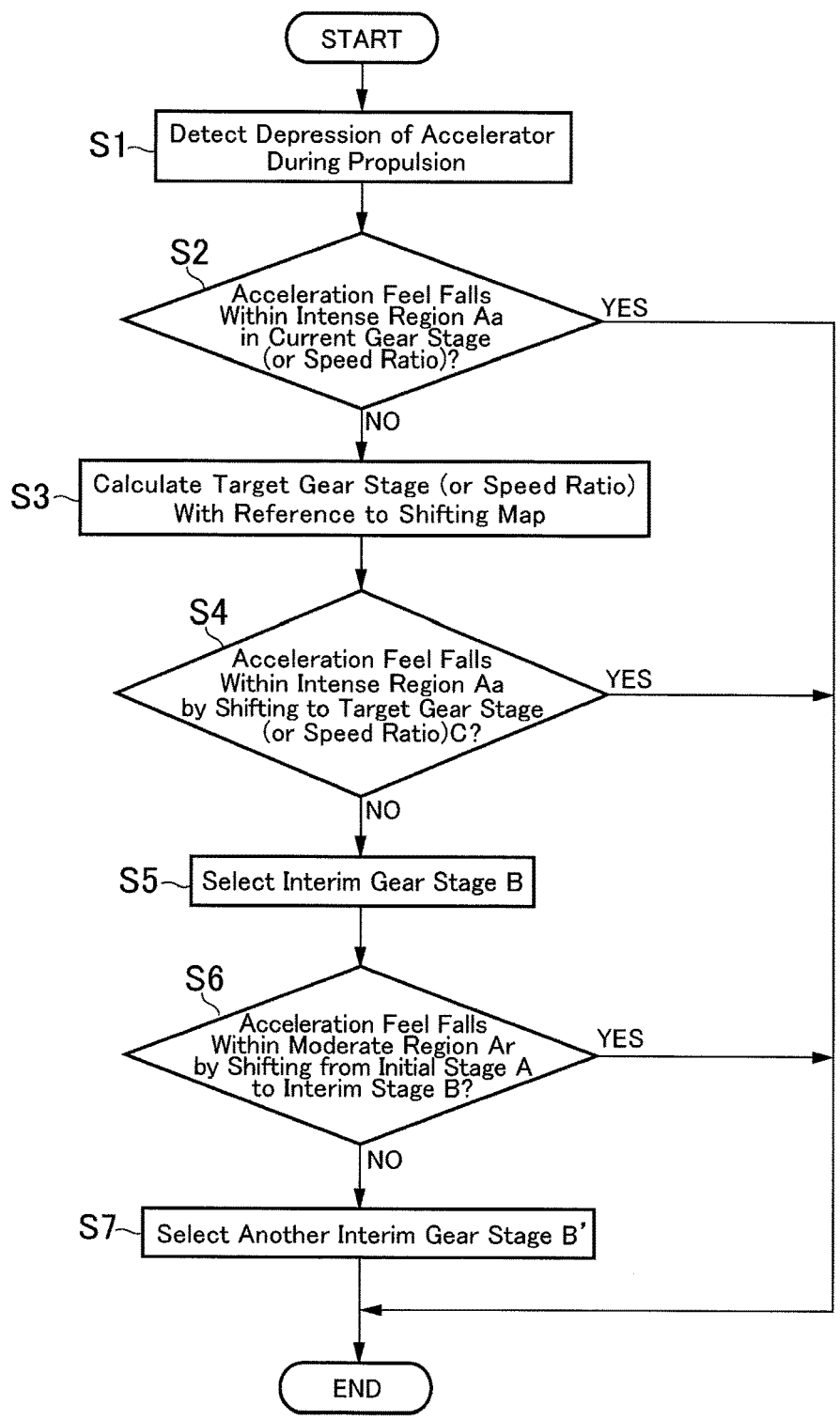
FIG. 5 is a flowchart showing one example of the shifting control according to the embodiment.

The ECU 5 is configured to carry out a shifting control shown in FIG. 5 with reference to the above-explained maps. In the control shown in FIG. 5, first of all, a depression of the accelerator pedal during propulsion is detected at step S1. Then, a possibility to achieve an acceleration feel falling within the intense region Aa in the initial gear stage A is determined at step S2. If the answer of step S2 is YES, the control is terminated without carrying out any specific control.

By contrast, if the answer of step S2 is NO, the routine progresses to step S3 to calculate a target gear stage C with reference to the shifting map. In this case, the acceleration G starts increasing in the initial gear stage A after the lapse of the first unconscious period T1, and the first unconscious period T1, the first jerk J1 and the first change amount ΔG1 of the acceleration G, that is, an acceleration feel to be achieved in the initial gear stage A is enclosed by the dashed circle P1 in FIG. 4. If the acceleration feel indicated by the circle P1 falls out of the lower boundary Arl as indicated by a cross P1 in FIG. 3, the answer of step S2 would be NO. Specifically, if a geared transmission is used as the transmission 2, the target gear stage C of the transmission 2 is determined with reference to the shifting map based on the current vehicle speed V and the accelerator opening ACC. If the ECU 5 is configured to control the shifting operation of the geared transmission 2 with reference to the shifting map, the target gear stage C may be calculated without carrying out the determination of step S2.

Then, at step S4, a possibility to achieve an acceleration feel falling within the intense region Aa by shifting the gear stage from the initial gear stage A to the calculated target gear stage C is determined. As described, a required time of the shifting operation (including a shifting time and a delay), an achievable jerk, an achievable acceleration feel per unit of time etc. are governed by a model and a grade of the vehicle, a change amount of speed ratio an accelerator opening etc. Those data are stored in the ECU 5 so that the determination of step S4 can be made based on the stored data. If the answer of step S4 is YES, the routine is terminated without carrying out subsequent controls. In this case, the gear stage is shifted to the target gear stage C by a conventional shifting procedure of the automatic transmission.

By contrast, if the answer of step S4 is NO, an interim gear stage B is selected at step S5. When the accelerator pedal is depressed deeply and hence the target gear stage C is set to the gear stage other than a numerically adjacent to the initial gear stage A to achieve the required drive force, the unconscious period T may be extended if the gear stage is shifted directly from the initial gear stage A to the target gear stage C by a mechanical limitation of the transmission 2 and a control delay. In this case, the unconscious period T falls out of the limit line T1 and the stimulation intensity Mi falls out of the moderate region Ar as indicated by the double circle Px in FIG. 3. In this case, therefore, the answer of step S4 will be NO.

Specifically, the interim gear stage B is selected in such a manner that the third unconscious period T3 and the third stimulation intensity Mi3 fall within the intense region Aa by shifting the gear stage from the interim gear stage B to the target gear stage C. In FIG. 4, the third unconscious period T3, the third jerk J3 and the third change amount ΔG3 of the acceleration G, that is, an acceleration feel to be achieved by shifting the gear stage from the interim gear stage B to the target gear stage C is enclosed by the dashed circle P3. Thus, the interim gear stage B is selected in such a manner that the acceleration feel falls within the intense region Aa as indicated by a star P3 in FIG. 3 by shifting the gear stage from the interim gear stage B to the target gear stage C. In the geared transmission, the settable speed ratios, that is, the gear stages are structurally determined, and hence the interim gear stage B is determined at step S5 only when the target gear stage C is set to the gear stage at least two stages away from the initial gear stage A. If the transmission 2 is a geared transmission, therefore, it is also determined at step S4 whether or not the target gear stage C determined at step S3 is numerically adjacent to the initial gear stage A. If the target gear stage C is at least two stages away from the initial gear stage A so that the answer of step S4 is NO, the routine progresses to step S5 to select the interim gear stage B.

If the interim gear stage B may be selected from a plurality of gear stages at step S5, the gear stage of the smallest speed ratio, that is, the closest gear stage to the initial gear stage A is selected as the interim gear stage B. For this reason, the third stimulation intensity Mi3 may be increased as much as possible within the acceptable third unconscious period T3 during shifting from the interim gear stage B to the target gear stage C to provide a satisfactory acceleration feel with the driver.

Thereafter, at step S6, a possibility to achieve the acceleration feel falling within the moderate region Ar by shifting the gear stage from the initial gear stage A to the selected interim gear stage B is determined. That is, it is determined whether or not the second stimulation intensity Mi2 falls within the moderate region Ar and the second unconscious period T2 falls within the lower boundary Aal by shifting the gear stage from the initial gear stage A to the selected interim gear stage B. If the answer of step S6 is YES, the routine is terminated. In this case, the gear stage is shifted continuously from the initial gear stage A to the target gear stage C via the interim gear stage B, and the acceleration G is increased in a mild manner within the moderate region Ar in the interim gear stage B. Accordingly, the downshifting from the initial gear stage A to the interim gear stage B corresponds to the "first shifting", and the downshifting from the interim gear stage B to the target gear stage C corresponds to the "second shifting".

As a result of shifting the gear stage from the initial gear stage A to the interim gear stage B thus determined, the second unconscious period T2, the second jerk J2 and the second change amount ΔG2 of the acceleration G are changed as enclosed by the dashed circle P2 in FIG. 4. That is, the second unconscious period T2 and the second stimulation intensity Mi2 (=(G2−G1)·J2) fall within the moderate region Ar. Thereafter, as a result of shifting the gear stage from the interim gear stage B to the target gear stage C, the third unconscious period T3 and the third stimulation intensity Mi3 (=(G3 −G2)·J3) fall within the intense region Aa. For this reason, the driver is allowed to feel an increase in the acceleration in response to an accelerating operation after the acceptable unconscious period and then allowed to feel a massive increase in the acceleration after the acceptable unconscious period. That is, the driver is allowed to feel a satisfactory increase in the acceleration without delay during execution of the skip shift.

In addition, the second stimulation intensity Mi2 during shifting from the initial stage A to the interim stage B is not so intense and hence the driver is allowed to feel smooth and continuous increase in the acceleration throughout the skip shift. That is, in the time chart shown in FIG. 4, the acceleration being increased temporarily remains on a plateau from the point t4 and hence the driver has an orienting response to such cessation of increase in the acceleration. In this situation, however, the acceleration feel still falls within the moderate region Ar. For this reason, the deliver is prevented from feeling an increase in the acceleration stepwise.

By contrast, if a difference between the speed ratio of the initial gear stage A and the speed ratio of the interim gear stage B is too large, the second unconscious period T2 is extended and hence the second stimulation intensity Mi2 falls out of the moderate region Ar. In this case, the answer of step S6 will be NO, and the routine progresses to step S7 to select a second interim gear stage B' in which a speed ratio is smaller than that of the interim gear stage B so that the second stimulation intensity Mi2 and the second unconscious period T2 fall within the moderate region Ar. In this case, a possibility to achieve the acceleration feel falling within the moderate region Ar by shifting the gear stage from the initial gear stage A to the second interim gear stage B' is also determined at step 6. If the acceleration feel still out of the moderate region Ar in spite of shifting the gear stage from the initial gear stage A to the second interim gear stage B', a third interim gear stage is selected at step S7.

After thus selecting the second interim gear stage B', the routine is terminated. In this case, the gear stage is shifted continuously from the initial gear stage A to the target gear stage C via the second interim gear stage B' and the interim gear stage B. For this reason, the driver is also allowed to feel an increase in the acceleration in response to an accelerating operation without delay during execution of the skip shift. In addition, the stimulation intensity Mi will not be increased to a level at which the driver senses an increase in the acceleration during shifting from the initial stage A to the second interim stage B', and during shifting from the second interim stage B' to the interim gear stage B. For this reason, the driver is allowed to feel smooth and continuous increase in the acceleration throughout the skip shift even if a plurality of interim gear stages intervenes in the skip shift. Accordingly, the downshifting from the initial gear stage A to the second interim gear stage B' corresponds to the "third shifting", and the downshifting from the second interim gear stage B' to the interim gear stage B corresponds to the "fourth shifting".

As described, the shifting control according to the embodiment is executed with reference to the foregoing shifting map and control map. According to the embodiment, therefore, the target gear stage can be determined immediately when the acceleration is demanded with reference to the shifting map, and the interim gear stage(s) can be determined with reference to the control map. Optionally, the interim gear stages may also be determined with respect to the initial gear stage and the target gear stage in the form of map. In this case, step S5 may be omitted in the shifting control shown in FIG. 5.

In the foregoing embodiment, the shifting control is applied to the automatic geared transmission in which the gear stages are structurally determined. However, the shifting control system may also be applied to a continuously variable transmission in which a speed ratio can be varied arbitrarily. In this case, a speed ratio of the continuously variable transmission is changed stepwise. An embodiment of applying the shifting control to the continuously variable transmission will be explained hereinafter with reference to FIG. 5.

As the foregoing embodiment, first of all, a depression of the accelerator pedal during propulsion is detected at step S1, and then, a possibility to achieve an acceleration feel falling within the intense region Aa with the initial speed ratio A is determined at step S2. If the answer of step S2 is YES, the control is terminated without carrying out any specific control. By contrast, if the answer of step S2 is NO, the routine progresses to step S3 to calculate a target speed ratio C with reference to the shifting map.

Then, at step S4, a possibility to achieve an acceleration feel falling within the intense region Aa by changing the speed ratio from the initial speed ratio A to the calculated target speed ratio C is determined. If the answer of step S4 is YES, the routine is terminated without carrying out subsequent controls. By contrast, if the answer of step S4 is NO, an interim speed ratio B is determined at step S5 in such a manner that the acceleration feel falls within the intense region Aa by changing the speed ratio from the interim speed ratio B to the target speed ratio C. If the target gear stage C is set to the gear stage numerically adjacent to the initial gear stage A in the geared transmission, there is no gear stage intervening therebetween. By contrast, in the continuously variable transmission, the interim speed ratio B may be set arbitrarily between the initial speed ratio a and the target speed ratio C. In this embodiment, therefore, it is not necessary to determine whether or not the required speed change operation is a skip shift.

In other words, in the continuously variable transmission, the interim speed ratio B may be varied infinitely between the initial speed ratio A and the target speed ratio C. In this case, therefore, it is preferable to set the interim speed ratios B in advance with respect to the initial speed ratio A and the target speed ratio C. If the interim speed ratio B may be selected from a plurality of speed ratios at step S5, the speed ratios of the smallest speed ratio is selected as the interim speed ratio B. Optionally, the interim speed ratio B may also be calculated in each case by a formula using the initial speed ratio A and the target speed ratio C as variables.

Thereafter, at step S6, a possibility to achieve the acceleration feel falling within the moderate region Ar by shifting the speed ratio from the initial speed ratio A to the interim speed ratio B is determined. If the answer of step S6 is YES, the routine is terminated. By contrast, if the answer of step S6 is NO, a second interim speed ratio B' that is smaller than the interim speed ratio B is determined at step S7. The second interim speed ratio B' may be not only selected from predetermined speed ratios but also calculated using the above-mentioned formula.

If another interim speed ratio that is larger than the interim speed ratio B or B" but still the acceleration feel falls within the intense region Aa and the moderate region Ar during execution of the skip shift is available, such speed ratio may also be set as the interim speed ratio B or B'.

Although the above exemplary embodiments of the present application have been described, it will be understood by those skilled in the art that the present application should not be limited to the described exemplary embodiments, and various changes and modifications can be made within the spirit and scope of the present application. For example, the intense region and the moderate region may also be determined with reference to a nominal map determining the intense region and the moderate region based on the unconscious period and the stimulation intensity. In this case, if a depression of the accelerator pedal is changed during the skip shift, the current interim gear stage or speed ratio will not be used on the next occasion of carrying out the skip shift, and the interim gear stage or speed ratio in another region of the nominal map is selected on the next occasion. The nominal map thus adjusted may be used as the control map.

What is claimed is:

1. A shift control system for an automatic vehicle transmission that shifts a speed ratio stepwise in accordance with a vehicle speed or a required drive force, comprising:
    a controller that controls the speed ratio; and
    a control map installed in the controller that determines:
        an intense region where a driver is allowed to sense an increase in an acceleration based on an unconscious period in which a drive force has not yet been changed to an extent that the driver is allowed to sense a change in the acceleration, and a stimulation intensity governed by a change amount of the acceleration after the unconscious period and a jerk; and a moderate region defined between a first lower boundary of the intense region determined by a first lower limit value of the stimulation intensity and a first upper limit value of the unconscious period in the intense region, and a second lower boundary determined by a second lower limit value of the stimulation intensity that is smaller than the first lower limit value but the driver is still allowed to sense a change in the acceleration and a second upper limit value of the unconscious period that is larger than the first upper limit value;
    wherein the controller is configured:
    to select a first interim speed ratio between an initial speed ratio and a target speed ratio determined based on a drive force required by an accelerating operation of the driver with reference to the control map such that the stimulation intensity and the unconscious period fall within the intense region by shifting the speed ratio from the first interim speed ratio to the target speed ratio, in a case where the stimulation intensity and the unconscious period fall out of the intense region by shifting the speed ratio directly from the initial speed ratio to the target speed ratio;
    to execute a first shifting from the initial speed ratio to the first interim speed ratio and a second shifting from the first interim speed ratio to the target speed ratio, in a case where the stimulation intensity and the unconscious period fall within the moderate region by executing the first shifting;
    to select at least one second interim speed ratio between the initial speed ratio and the first interim speed ratio with reference to the control map such that the stimulation intensity and the unconscious period fall within the moderate region by shifting the speed ratio from the initial speed ratio to the first interim speed ratio, in a case where the stimulation intensity and the unconscious period fall out of the moderate region by shifting the speed ratio from the initial speed ratio to the first interim speed ratio; and
    to execute a third shifting from the initial speed ratio to the second interim speed ratio, a fourth shifting from the second interim speed ratio to the first interim speed ratio, and the second shifting, in a case where the second interim speed ratio is selected between the initial speed ratio and the first interim speed ratio.

2. The shift control system for the automatic vehicle transmission as claimed in claim 1,
    wherein the transmission includes a geared transmission, and
    wherein the speed ratio includes a gear stage of the geared transmission.

3. The shift control system for the automatic vehicle transmission as claimed in claim 1,
    wherein the transmission includes a continuously variable transmission, and
    wherein the interim speed ratio includes a speed ratio between steps of the speed ratio.

4. The shift control system for the automatic vehicle transmission as claimed in claim 1, wherein the controller is further configured to select a speed ratio closest to the initial speed ratio as the interim speed ratio, in a case where the interim speed ratio may be selected from a plurality of speed ratios.

5. A shift control method for an automatic vehicle transmission that shifts a speed ratio stepwise in accordance with a vehicle speed or a required drive force, comprising:
    a control map that determines: an intense region where a driver is allowed to sense an increase in an acceleration based on an unconscious period in which a drive force has not yet been changed to an extent that the driver is allowed to sense a change in the acceleration, and a stimulation intensity governed by a change amount of the acceleration after the unconscious period and a jerk; and a moderate region defined between a first lower boundary of the intense region determined by a first lower limit value of the stimulation intensity and a first upper limit value of the unconscious period in the intense region, and a second lower boundary determined by a second lower limit value of the stimulation intensity that is smaller than the first lower limit value but the driver is still allowed to sense a change in the acceleration and a second upper limit value of the unconscious period that is larger than the first upper limit value;

selecting a first interim speed ratio between an initial speed ratio and a target speed ratio determined based on a drive force required by an accelerating operation of the driver with reference to the control map such that the stimulation intensity and the unconscious period fall within the intense region by shifting the speed ratio from the first interim speed ratio to the target speed ratio, in a case where the stimulation intensity and the unconscious period fall out of the intense region by shifting the speed ratio directly from the initial speed ratio to the target speed ratio;

executing a first shifting from the initial speed ratio to the first interim speed ratio and a second shifting from the first interim speed ratio to the target speed ratio, in a case where the stimulation intensity and the unconscious period fall within the moderate region by executing the first shifting;

selecting at least one second interim speed ratio between the initial speed ratio and the first interim speed ratio with reference to the control map such that the stimulation intensity and the unconscious period fall within the moderate region by shifting the speed ratio from the initial speed ratio to the first interim speed ratio, in a case where the stimulation intensity and the unconscious period fall out of the moderate region by shifting the speed ratio from the initial speed ratio to the first interim speed ratio; and executing a third shifting from the initial speed ratio to the second interim speed ratio, a fourth shifting from the second interim speed ratio to the first interim speed ratio, and the second shifting, in a case where the second interim speed ratio is selected between the initial speed ratio and the first interim speed ratio.

* * * * *